United States Patent [19]
Saito

[11] 3,802,641
[45] Apr. 9, 1974

[54] SEAT BELT WEBBING RETRACTOR
[75] Inventor: Takashi Saito, Toyota, Japan
[73] Assignee: Toyota Jidosha Kogyo Kabushiki Kaisha, Toyota, Japan
[22] Filed: June 4, 1973
[21] Appl. No.: 366,507

[30] Foreign Application Priority Data
Aug. 25, 1972 Japan..........................47-99713

[52] U.S. Cl...............242/107 R, 242/74, 242/74.1, 242/107.4
[51] Int. Cl............................................ B65h 75/28
[58] Field of Search.................... 242/107, 74, 74.1; 297/386, 388; 280/150 SB

[56] References Cited
UNITED STATES PATENTS
| | | | |
|---|---|---|---|
| 1,183,819 | 5/1916 | Keiser | 242/74.1 |
| 3,291,416 | 12/1966 | Gionta | 242/107 SB |
| 3,550,875 | 12/1970 | Settimi | 242/107.4 |
| 3,214,218 | 10/1965 | Gill | 242/107.4 |

Primary Examiner—John W. Huckert
Assistant Examiner—Jon W. Henry
Attorney, Agent, or Firm—Stevens, Davis, Miller & Mosher

[57] ABSTRACT

A seat belt webbing retractor comprising a hollow belt take-up sleeve formed with a slit extending over the length of the sleeve periphery, a rotative shaft concentrically extending within and integrally coupled to the take-up sleeve and a seat belt webbing having a folded end portion provided with a loop and accommodated in the gap between the take-up sleeve and the rotative shaft. With this construction, smooth take-up and rewind of the seat belt can be ensured. Also, reliable and uniform take-up and rewind with less change in the take-up torque can be ensured. Further, since the folded portion of the seat belt webbing is not wound on the outer periphery of the take-up sleeve, the take-up sleeve diameter can be reduced that much so as to reduce the overall size of the retractor.

9 Claims, 5 Drawing Figures

3,802,641

SEAT BELT WEBBING RETRACTOR

This invention relates to seat belts provided in the seat of automobiles and aircrafts and, more particularly, to seat belt webbing take-up means or retractors.

In the prior-art seat belt webbing retractor, a folded portion formed in an end portion of the seat belt webbing is taken up on the outer side of a take-up sleeve. Therefore, the quantity of the seat belt webbing taken up is reduced by the thickness of the folded portion. Also, since the folded portion of the seat belt webbing is wound as the first turn, the rate of change of the effective diameter at the time of the first turn is large compared to the rate of change of the effective diameter at the time of the subsequent turns. Further, the spring force required for the take-up is very great for the first turn compared to the second and subsequent turns, so that a uniform take-up force cannot be obtained.

An object of the invention is to provide a seat belt webbing retractor, in which the folded end portion of the seat belt webbing is held and accommodated in the gap between a take-up sleeve and a rotative shaft and is not wound on the take-up sleeve, thereby permitting smooth take-up and rewind of the seat belt webbing.

Another object of the invention is to ensure reliable and uniform take-up and rewind with less change in the take-up torque and smooth operation with an-arcual profile of the take-up periphery.

Further, since the folded portion of the seat belt webbing is not wound on the outer periphery of the take-up sleeve, the take-up sleeve diameter can reduced that much so as to reduce the overall size of the retractor.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

FIGS. 1 to 3 show one embodiment of the invention, and in which;

FIG. 1 is a perspective view of the whole retractor,

FIG. 2 is an exploded perspective view showing some parts of the same retractor, and FIG. 3 is a sectional view taken along line III—III in FIG. 1, FIGS. 4 and 5 show another embodiment, and in which;

Figure 1:
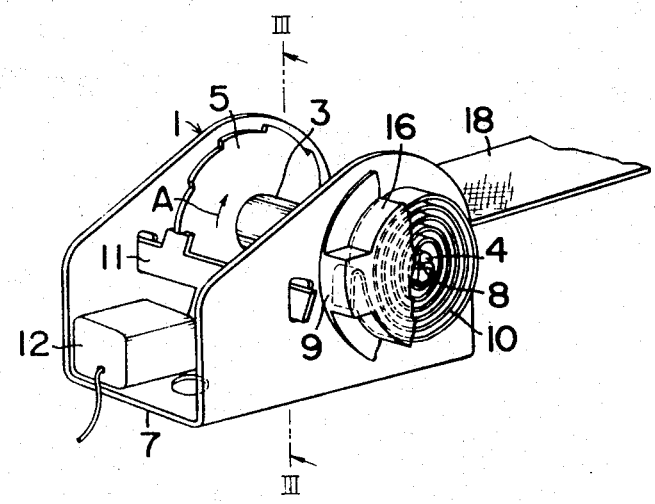
Figure 2:
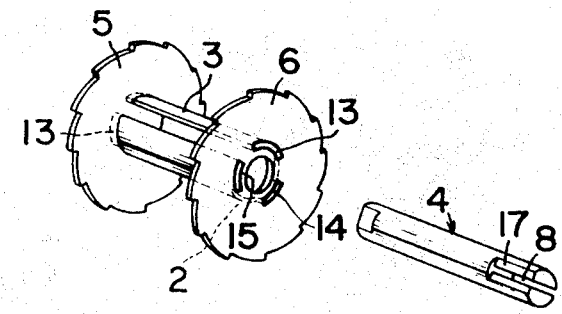
Figure 3:
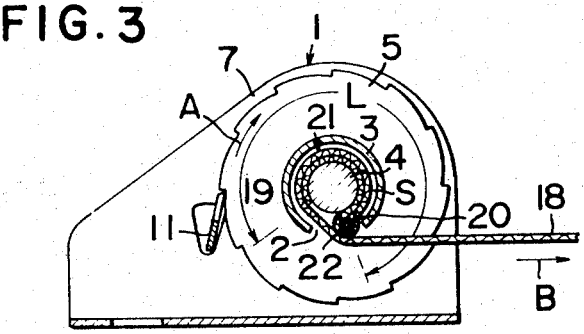

FIGS. 1 to 3 show a first embodiment of the retractor generally designated at 1. It comprises a take-up means having an integral structure consisting of a hollow take-up sleeve 3 having a slit 2 extending through the length of the periphery, a rotative shaft 4 concentrically extending in said sleeve and ratchet wheels 5 and 6 at the opposite ends. The take-up means is rotatably mounted in a support frame 7, and it is always biased in the take-up direction of arrow (A) by the spring force of a spiral spring 10 mounted between a groove 8 formed in one end of the rotative shaft 4 and a depression 9 of a cover 16 provided on the outer side of the support frame 7. The cover 16 covers the spiral spring 10. A pawl member 11 is provided in the support frame 7, and it is adapted to be advanced to a position to mesh with the teeth of the ratchet wheels 5 and 6 by means of a solenoid 12 at the time of an emergency such as a collision.

The ratchet wheels 5 and 6 and the take-up sleeve 3 are integrally coupled by inserting projections 13 formed at the opposite ends of the take-up sleeve 3 into stamped holes 14 in the ratchet wheels 5 and 6 as shown in FIG. 2. Also, the rotative shaft 4 concentrically extending within the hollow take-up sleeve 3 is integrally coupled by passing it through the ratchet wheel 5 and fitting its notched end portion 17 in a corresponding hole 15 of a complementary shape in the ratchet wheel 6. Thus, these three are integrally coupled to move in unison with one another.

FIG. 3 shows a structure where a seat belt webbing 18, the take-up sleeve 3 and the rotative shaft 4 are connected to one another. In FIG. 3, the seat belt webbing 18 has an end portion 19 which is folded for a small length (L) and forms a loop 20. The folded portion 21 has such a dimension that its length (L) can be accommodated in the gap (S) between take-up sleeve 3 and rotative shaft 4.

The folded portion 21 is withdrawn into the gap (S) through the slit 2 of the take-up sleeve 3, and the loop 20 is taken out through the slit 2 after being wound once round the take-up shaft 3. A wedge member 22 is inserted into the loop 20 after the loop is taken out of the gap (S), so that the loop is made bulky enough to prevent its withdrawal into the gap (S). Said wedge member extends in the slit of said take-up sleeve. Said wedge member has a cylindrical shape and is 1/4 to 1/3 times the diameter of said rotative shaft.

In other words, the end portion 19 of the seat belt webbing 18 is inserted between the take-up sleeve 3 and rotative shaft 4 integrally coupled to each other, and it is held anchored to the gap (S) between the two parts 3 and 4 by the wedge member 22 inserted into the loop 20.

In FIG. 3, when a tensile force in the direction of arrow (B) is exerted to the seat belt webbing 18, the loop 20 made bulky is driven like a wedge into the gap (S) between take-up sleeve 3 and rotative shaft 4 adjacent the slit 2, so that it can be reliably held in position.

In the illustrated embodiment, the wedge member 22 is shown to be a cylindrical shape, however this shape is by no means limiting.

When the exerted tension is removed, the rotative shaft 4, take-up sleeve 3 and ratchet wheels 5 and 6 are rotated in unison in the direction of arrow (A) by the restoring force of the spiral spring 10, so that the seat belt webbing 18 is taken up on the periphery of the take-up sleeve 3. At this time, since the folded portion 21 is not present on the outer side of the take-up sleeve 3, the seat belt webbing 18 can be taken up smoothly along the periphery of the take-up sleeve 3 as a single layer from the first turn.

Figure 4:
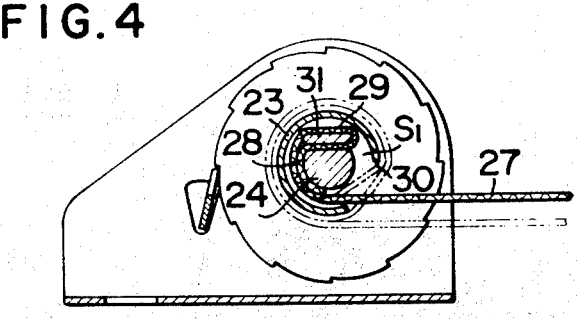
FIG. 4 is a sectional view of the same.
Figure 5:
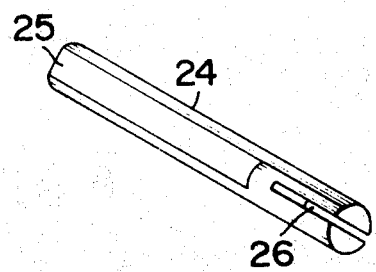
FIG. 5 is a perspective view of a rotative shaft.

FIGS. 4 and 5 show another embodiment. In this embodiment, take-up sleeve 23 has a similar structure to that of the previous embodiment of FIGS. 1 to 3. However, rotative shaft 24 is formed with a notch 25 substantially extending over the entire length of its main portion. It is also formed at its one end with a groove 16, in which an end of a spiral spring not shown is received similar to the previous embodiment.

Similar to the previous embodiment, seat belt webbing 27 has its end portion formed with folded portion 28 and loop 29. The folded portion 28 and loop 29 are withdrawn into gap ($S_1$) between take-up sleeve 23 and rotative shaft 24 through slit 30 formed in the sleeve 23 over the length thereof. The extent of the withdrawal is such that the loop 29 is positioned over the notch 25 of the rotative shaft 24. At this position, the loop 29 is expanded or made bulky by inserting a wedge member 31 such as a flat bar into it. Said notch formed in said rotative shaft is out of alignment with the slit of said take-up sleeve. Said wedge member has a plate-like form and is disposed in said notch formed in said rotative shaft. The width of said wedge member is 4/4 to 6/4 times the diameter of said rotative shaft. The loop 29 thus expanded by inserting the wedge member 31 can no longer be moved in the gap ($S_1$) between the take-up sleeve 23 and rotative shaft 24, and it is held wedged in the gap ($S_1$) similar to the previous embodiment.

Similar to the previous embodiment, the folded portion 28 has a length such that it can be accommodated within the gap ($S_1$) and will not extend through the slit 30 to the outside.

What we claim is:

1. A seat belt webbing retractor comprising
   a hollow belt take-up sleeve formed with a slit extending over the length of the sleeve periphery;
   a rotative shaft extending within and concentrically with said take-up sleeve and integrally coupled to said take-up sleeve;
   a ratchet gearing means mounted on opposite ends of said take-up sleeve;
   a support member for supporting said rotative shaft;
   a seat belt webbing having a folded portion provided with a loop, said folded portion being accommodated in the gap between said take-up sleeve and said rotative shaft;
   a wedge member in said loop between said take-up sleeve and said rotative shaft, said wedge member pressing portions of the webbing loop against said rotative shaft and said take-up sleeve when a seat belt withdrawing force is applied to the webbing loop; and
   a spring means giving a torque to said rotative shaft in such a way as to be able to take up said seat belt webbing on said take-up sleeve;
   the roll of the seat belt taken up having a substantially circular cross section.

2. A seat belt webbing retractor as defined in claim 1, wherein said take-up sleeve and said ratchet gearing means are integrally coupled by fitting a plurality of projections formed at each end of said take-up sleeve into a plurality of stamped holes formed in each of said ratchet gearing means.

3. A seat belt webbing retractor as defined in claim 1, wherein said take-up sleeve and said rotative shaft are integrally coupled by fitting a notched end portion of said rotative shaft in a hole of a complementary shape formed in one of said ratchet gearing means.

4. A seat belt webbing retractor as defined in claim 1, wherein said rotative shaft has its one end formed with a groove for mounting a spiral spring exerting torque to said rotative shaft.

5. A seat belt webbing retractor as defined in claim 1, wherein said wedge member extends in the slit of said take-up sleeve.

6. A seat belt webbing retractor as defined in claim 5, wherein said wedge member has a cylindrical shape.

7. A seat belt webbing retractor as defined in claim 6, wherein the diameter of said wedge member is ¼ to ⅓ times the diameter of said rotative shaft.

8. A seat belt webbing retractor as defined in claim 1, wherein said rotative shaft is formed with an axial notch substantially extending over the entire length of its main portion, said notch being out of alignment with the slit of said take-up sleeve, said wedge member having a plate-like form and being disposed in said notch formed in said rotative shaft.

9. A seat belt webbing retractor as defined in claim 8, wherein the width of said wedge member is 4/4 to 6/4 times the diameter of said rotative shaft.

* * * * *